United States Patent
Lindell et al.

(10) Patent No.: US 6,974,362 B2
(45) Date of Patent: Dec. 13, 2005

(54) SYSTEM AND METHOD FOR AUTOMATICALLY COMPENSATING FOR UNBALANCED RESISTANCE FORCES

(75) Inventors: Hans Lindell, Säve (SE); Joakim Jönsson, Hisings-Backa (SE); Volker Wendt, Gochsheim (DE); Paul Wierzba, Alberta (CA)

(73) Assignee: SKF Autobalance Systems AB, Gothenburg (SE)

( * ) Notice: Subject to any disclaimer, the term of this patent is extended or adjusted under 35 U.S.C. 154(b) by 157 days.

(21) Appl. No.: 10/435,672

(22) Filed: May 12, 2003

(65) Prior Publication Data

US 2004/0082283 A1 Apr. 29, 2004

Related U.S. Application Data

(60) Provisional application No. 60/379,765, filed on May 14, 2002.

(51) Int. Cl.[7] .......................... B24B 49/00; B24B 51/00; B24B 1/00
(52) U.S. Cl. ................................ 451/5; 451/8; 451/24; 451/343; 451/357; 74/573 P; 74/573 F
(58) Field of Search ........................... 451/5, 8, 11, 24, 451/343, 357; 74/573 P, 573 F; 83/647.5, 646, 647

(56) References Cited

U.S. PATENT DOCUMENTS

| | | | |
|---|---|---|---|
| 2,164,900 A | | 7/1939 | Campbell |
| 3,702,082 A | * | 11/1972 | Decker ..................... 74/573 R |
| 3,733,923 A | | 5/1973 | Goodrich et al. |
| 3,776,065 A | * | 12/1973 | Unno et al. ............... 74/573 R |
| 3,822,514 A | * | 7/1974 | Vetter ......................... 451/343 |
| 4,225,163 A | * | 9/1980 | Hubbard et al. .............. 292/21 |
| 4,674,356 A | | 6/1987 | Kilgore |
| 4,729,194 A | * | 3/1988 | Maier et al. ................. 451/357 |
| 4,787,132 A | | 11/1988 | Kilgore |
| 4,854,085 A | | 8/1989 | Huber |
| 4,905,419 A | * | 3/1990 | Makarov et al. .............. 451/21 |
| 4,905,776 A | | 3/1990 | Beynet et al. |
| 5,125,188 A | * | 6/1992 | Ogawa et al. ................. 451/5 |
| 5,549,019 A | * | 8/1996 | Cattani ......................... 74/573 |
| 5,768,951 A | | 6/1998 | Hannah et al. |
| 6,206,771 B1 | * | 3/2001 | Lehman ..................... 451/357 |

FOREIGN PATENT DOCUMENTS

| | | |
|---|---|---|
| GB | 2 319 197 A | 5/1998 |
| WO | 02/08636 A3 | 1/2002 |

OTHER PUBLICATIONS

Swedish International Search Report dated Sep. 30, 2003.

* cited by examiner

*Primary Examiner*—M. Rachuba
(74) *Attorney, Agent, or Firm*—Burns, Doane Swecker & Mathis LLP

(57) ABSTRACT

A balancing method and apparatus is used for dynamically balancing an out of balance condition in a rotating body caused by resistance forces acting tangentially to the body. A device having a rotatable component and automatic or dynamic balancing includes a housing, a shaft rotatably mounted in the housing, the shaft supporting the component near one end of the shaft, at least one counterweight fixedly mounted on the shaft and at least one automatically adjusting balancer mounted on the shaft. The automatically adjusting balancer includes one or more compensating masses contained to move about a path relative to the shaft to compensate for variable imbalanced forces acting on the component.

20 Claims, 15 Drawing Sheets

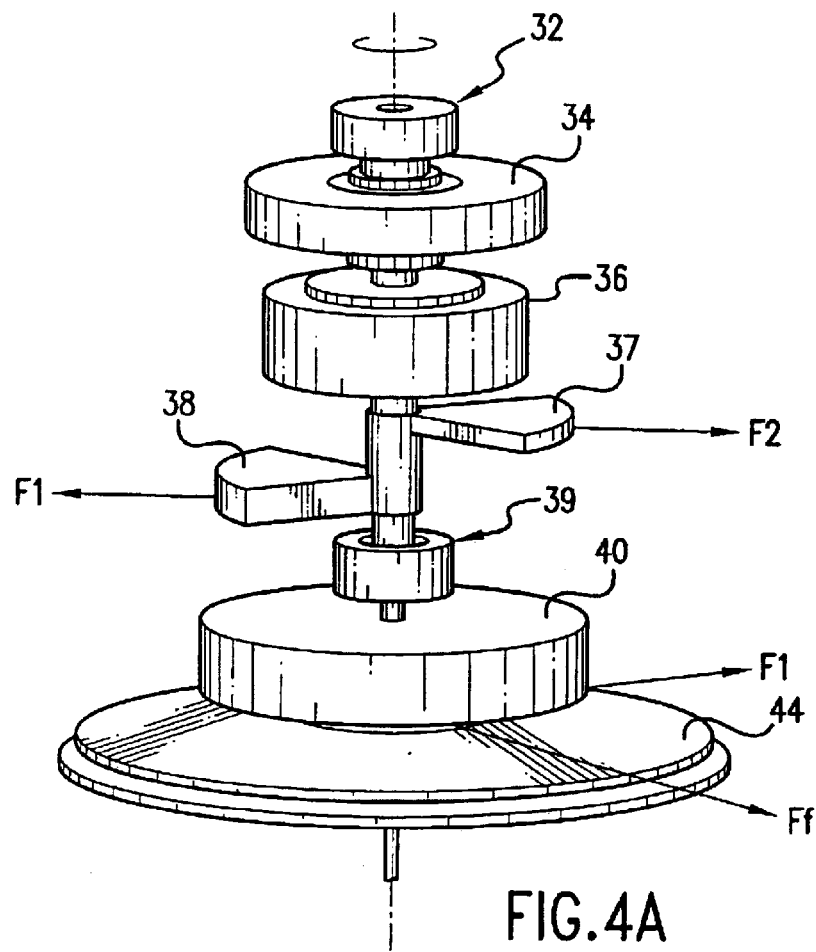
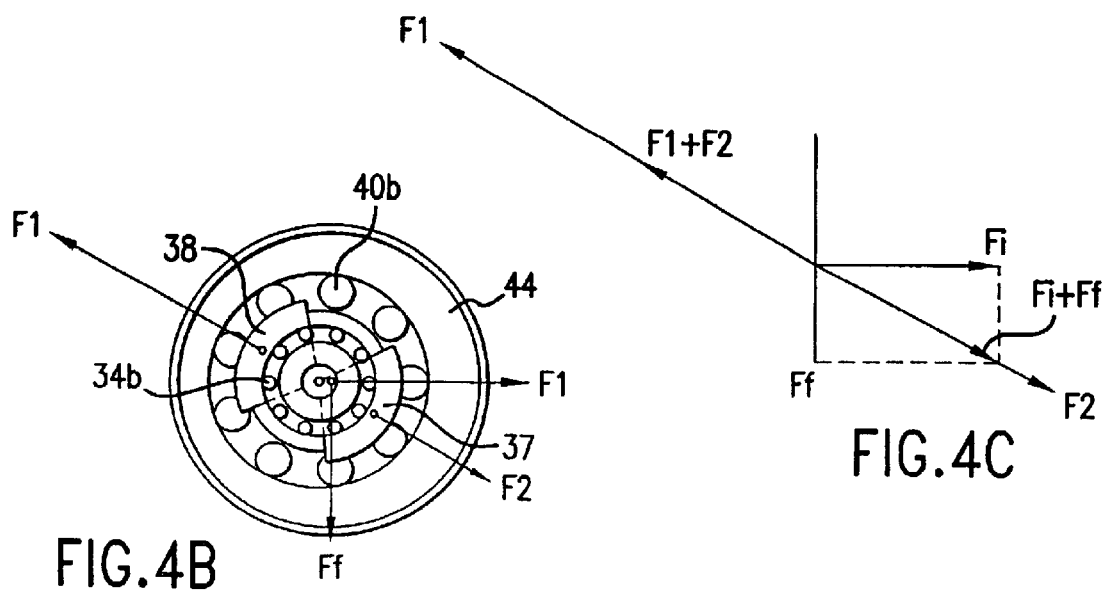
FIG.4A
FIG.4B
FIG.4C

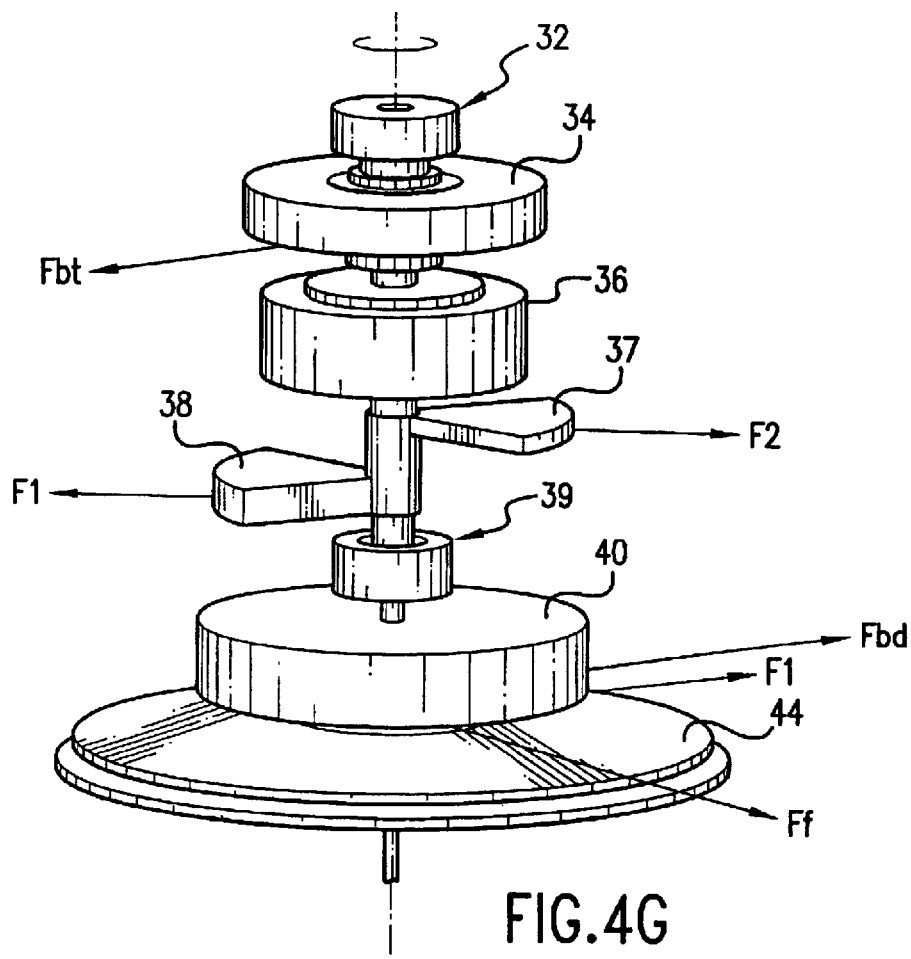
FIG.4G
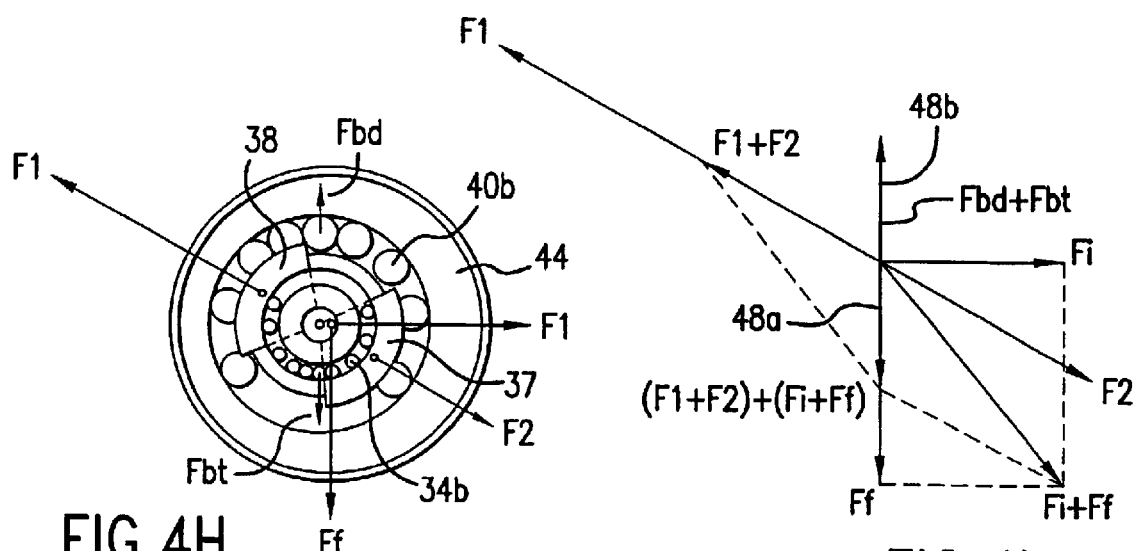
FIG.4H
FIG.4I

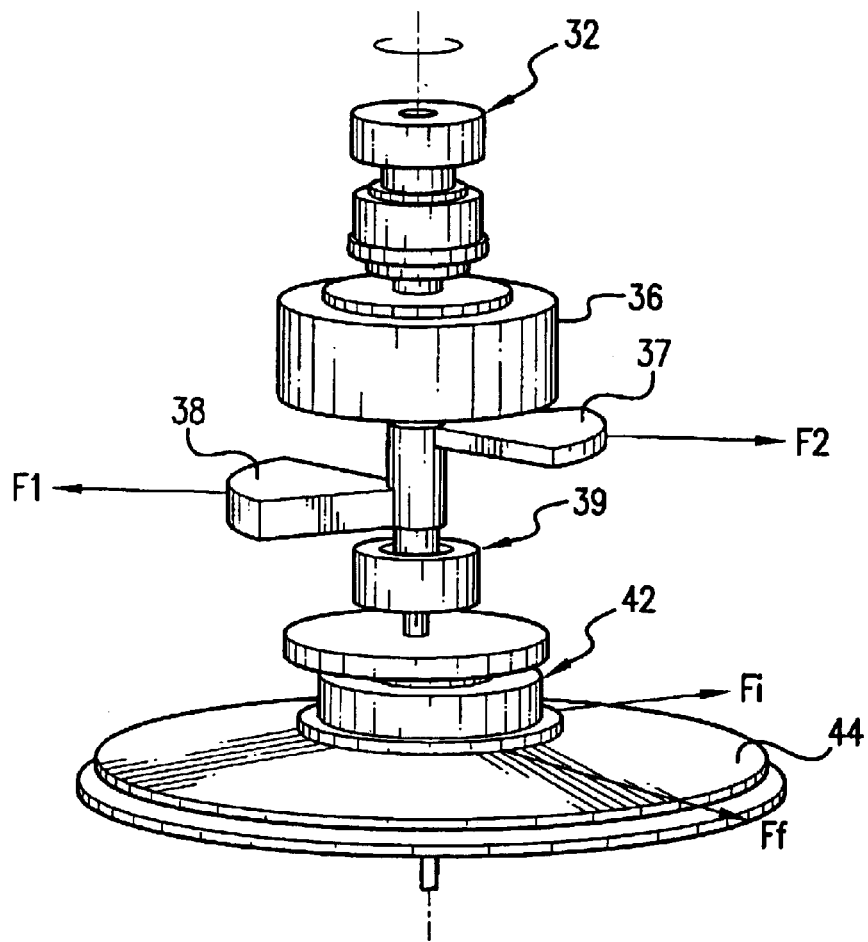
FIG.4J
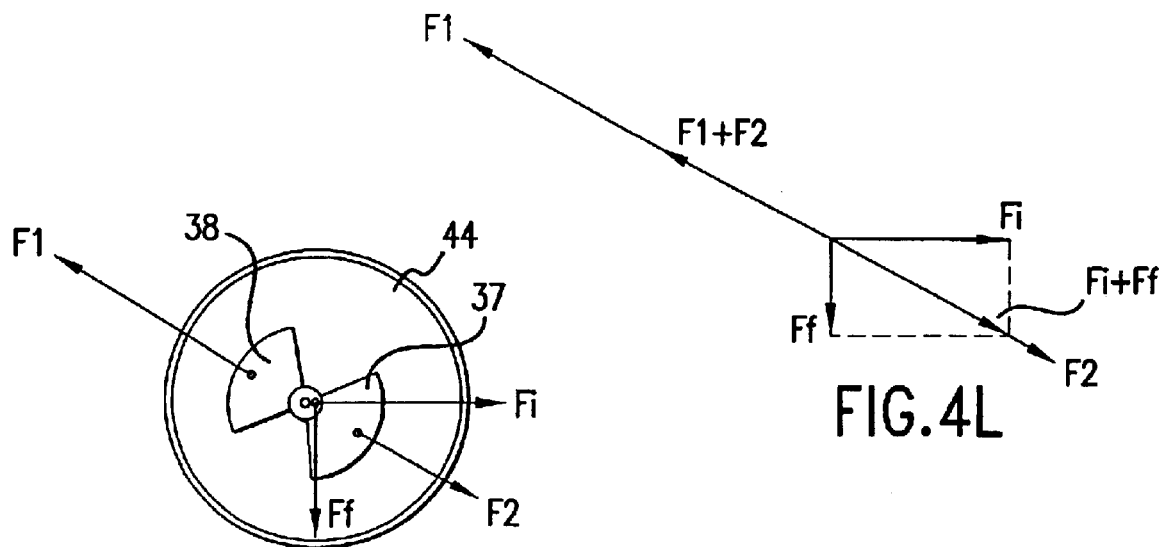
FIG.4K
FIG.4L

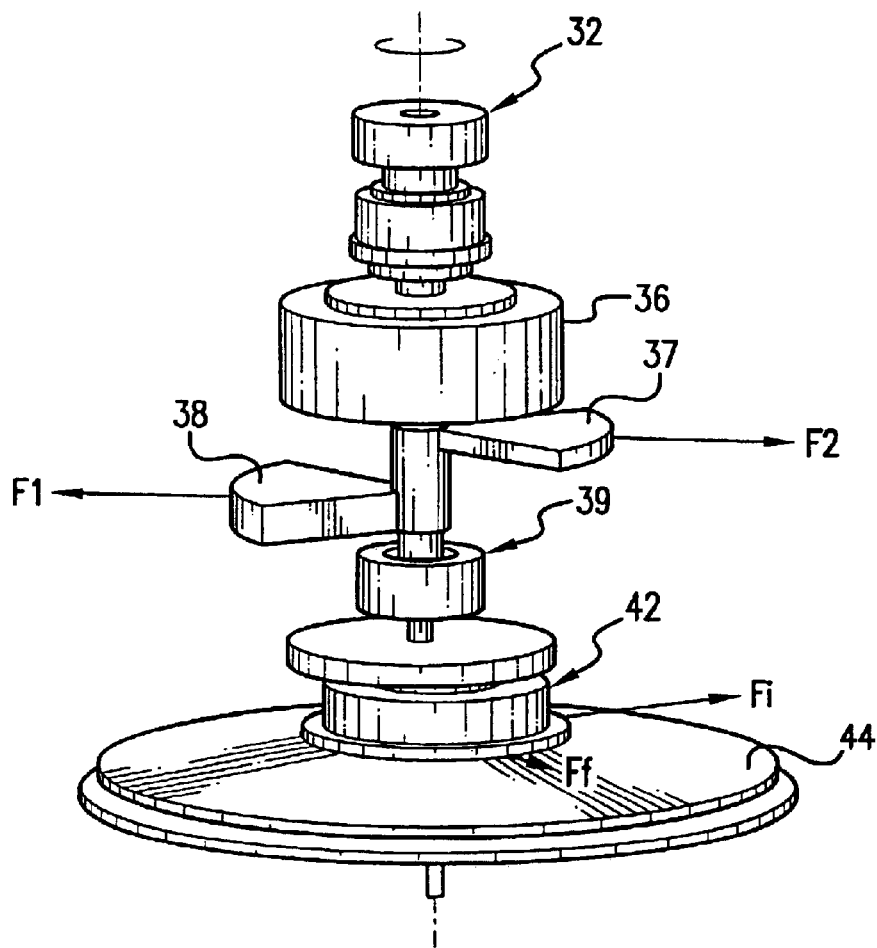
FIG.4M
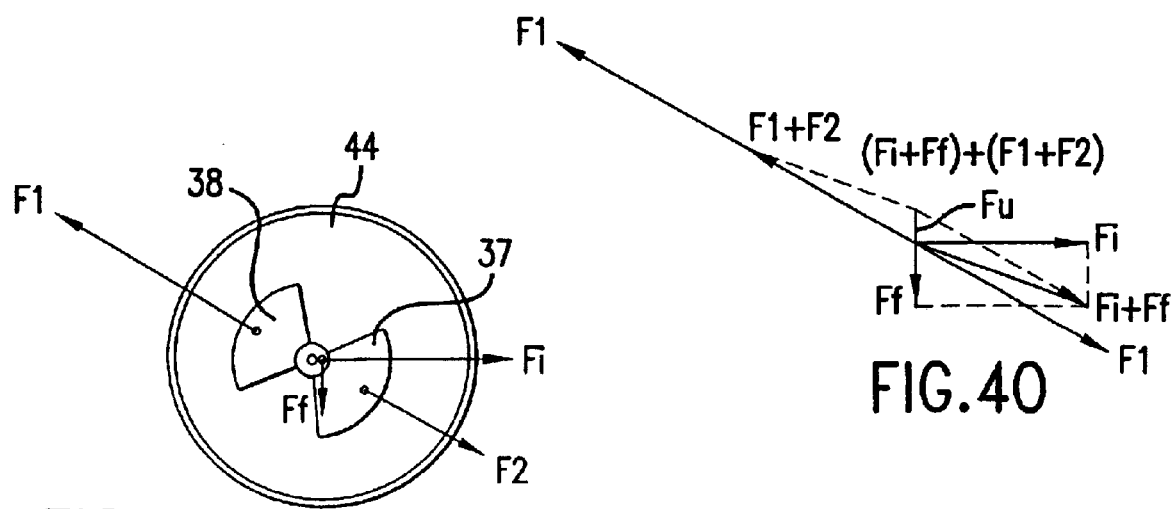
FIG.4N
FIG.4O

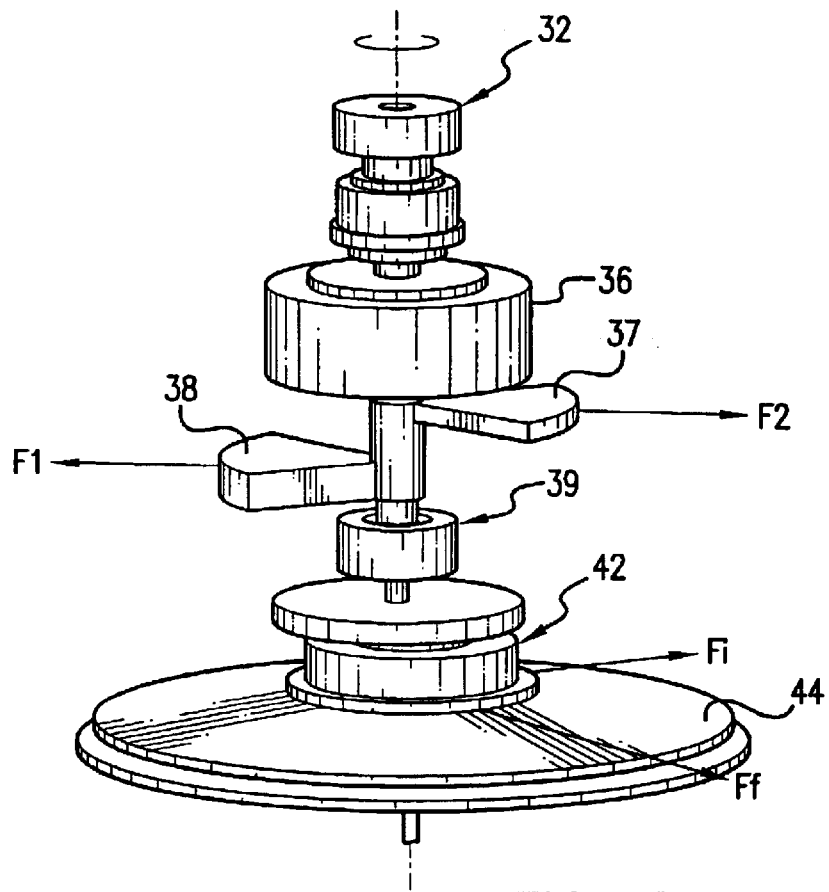
FIG.4P
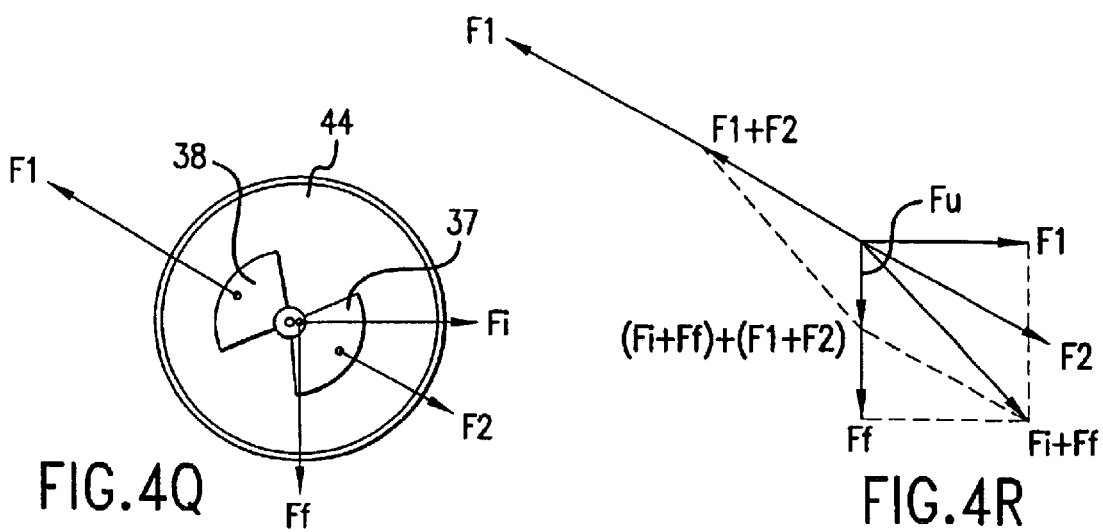
FIG.4Q
FIG.4R

SYSTEM AND METHOD FOR AUTOMATICALLY COMPENSATING FOR UNBALANCED RESISTANCE FORCES

This application claims priority to U.S. Provisional Patent Application No. 60/379,765, filed May 14, 2002, the entire disclosure of which is incorporated herein by reference.

FIELD OF THE INVENTION

This invention relates to a balancing method and apparatus and, more particularly, to a balancing method and apparatus used for dynamically balancing an out of balance condition in a rotating body caused by resistance forces acting tangentially to the body.

BACKGROUND OF THE INVENTION

Many different apparatus for balancing an out of balance condition in a rotating body are known. Such apparatus generally include a counterweight having a weight of a predetermined value which is located at a predetermined position from the axis of rotation to oppose an imbalance in the rotating body. The magnitude of the imbalance is generally known and, accordingly, the necessary weight and position of the counterweight can be calculated so that the weight is positioned where it will act to counter the known imbalance. When the mass imbalance remains substantially constant during rotation of the machine, a conventional method for removing such imbalance involves attaching or positioning counterweights equal to the amount of imbalance to the rotating body, and in a position directly opposite to the imbalance.

Under dynamic conditions, that is, when a body is rotating about an axis and an imbalance in the rotating body develops because of external conditions or otherwise, techniques are known wherein a vibration dampening assembly is provided with a plurality of annular grooves or races located about the periphery of the assembly and extending axially there along. A plurality of balls or rollers are located in each of the races. Such balls or rollers are free to move along the races and thereby counteract the imbalance forces.

Out of balance conditions can develop in rotating bodies resulting from rotating resistance forces. Such out of balance conditions result from an interaction of the rotating body with the surrounding fluid and/or stationery surfaces. In particular, such out of balance conditions may occur when the rotating body is not substantially symmetric. This non-symmetricity gives rise to detrimental unbalanced rotating resistance forces. Machines that experience these unbalanced rotating resistance forces include orbital sanders, marine and aircraft propellers, mixers, processors, fans, etc.

SUMMARY OF THE INVENTION

According to one aspect of the invention, a balancing apparatus is provided to remove imbalance in a rotating body wherein the imbalances tend to change during use, such as imbalances resulting during a sanding operation using an orbital sander. According to another aspect of the invention, the tangential imbalanced forces that are compensated for result in particular with devices having a rotatable component that encounters resistance in a tangential direction as a result of a medium the component is moved through during use. The rotating resistance forces that develop during the use of an orbital sander or other device cannot be predetermined in advance and tend to change greatly during the operation of the machine. Accordingly, such balancing inherently leads to residual imbalances and associated vibrations. These residual vibrations can be particularly high on high-speed machines. The imbalances which change during operation of the machine, can lead to severe vibrations and damage.

According to one embodiment of the invention, a device having a rotatable component and automatic or dynamic balancing includes a housing, a shaft rotatably mounted in the housing, the shaft supporting the component near one end of the shaft, at least one counterweight fixedly mounted on the shaft and at least one automatically adjusting balancer mounted on the shaft. The automatically adjusting balancer includes one or more compensating masses contained to move about a path relative to the shaft to compensate for variable imbalanced forces acting on the component.

According to a further aspect of the invention, the at least one counterweight fixedly mounted on the shaft is mounted in a different plane then the plane within which the at least one automatically adjusting balancer is mounted.

According to yet a further aspect of the invention, the at least one automatically adjusting balancer is mounted on the shaft closer to a plane within which the variable imbalanced forces are acting on the component than the at least one counterweight.

BRIEF DESCRIPTION OF THE DRAWING FIGURES

FIG. 4A is a perspective view of the automatic balancing apparatus according to the first embodiment of the invention and illustrating various forces acting on the balancing apparatus.

FIG. 4B is a top plan view, partially sectioned, of the automatic balancing apparatus shown in FIG. 4A.

FIG. 4C is a diagrammatic representation of the various unbalance and counterweight forces acting on the automatic balancing apparatus shown in FIG. 4A. Specifically, FIG. 4C shows the typical forces for a normal sanding operation.

FIG. 4F shows various forces for a light sanding operation.

FIG. 4G is a further perspective view of an automatic balancing apparatus according to the first embodiment of the invention and illustrating various forces acting on the balancing apparatus.

FIG. 4H is a top plan view, partially sectioned, of the balancing apparatus shown in FIG. 4G, and illustrating various forces acting on the components of the balancing apparatus.

FIG. 4I is a diagrammatic representation of the various unbalance and counterweight forces acting on the balancing apparatus shown in FIG. 4G during a heavy sanding operation.

FIG. 4J illustrates an exemplary balancing apparatus that does not have automatic balancing features, showing various forces acting on the balancing apparatus.

FIG. 4K is a top plan view, partially sectioned, of the balancing apparatus shown in FIG. 4J.

FIG. 4L is a diagrammatic representation of the various forces acting on the balancing apparatus shown FIG. 4J during a normal sanding operation.

FIG. 4M is a further perspective view of a balancing apparatus such as that shown in FIG. 4J, and not having any automatic balancing features.

FIG. 4N is a top plan view, partially sectioned, of the balancing apparatus shown in FIG. 4M.

FIG. 4O is a diagrammatic representation of the various forces acting on the balancing apparatus shown in FIG. 4M during a light sanding operation.

FIG. 4P is a further perspective view of a balancing apparatus that does not have any automatic balancing features.

FIG. 4Q is a top plan view, partially sectioned, of the balancing apparatus shown in FIG. 4P.

FIG. 4R is a diagrammatic representation of the various forces acting on the balancing apparatus shown in FIG. 4P during a heavy sanding operation.

DETAILED DESCRIPTION OF THE INVENTION

Figure 1:
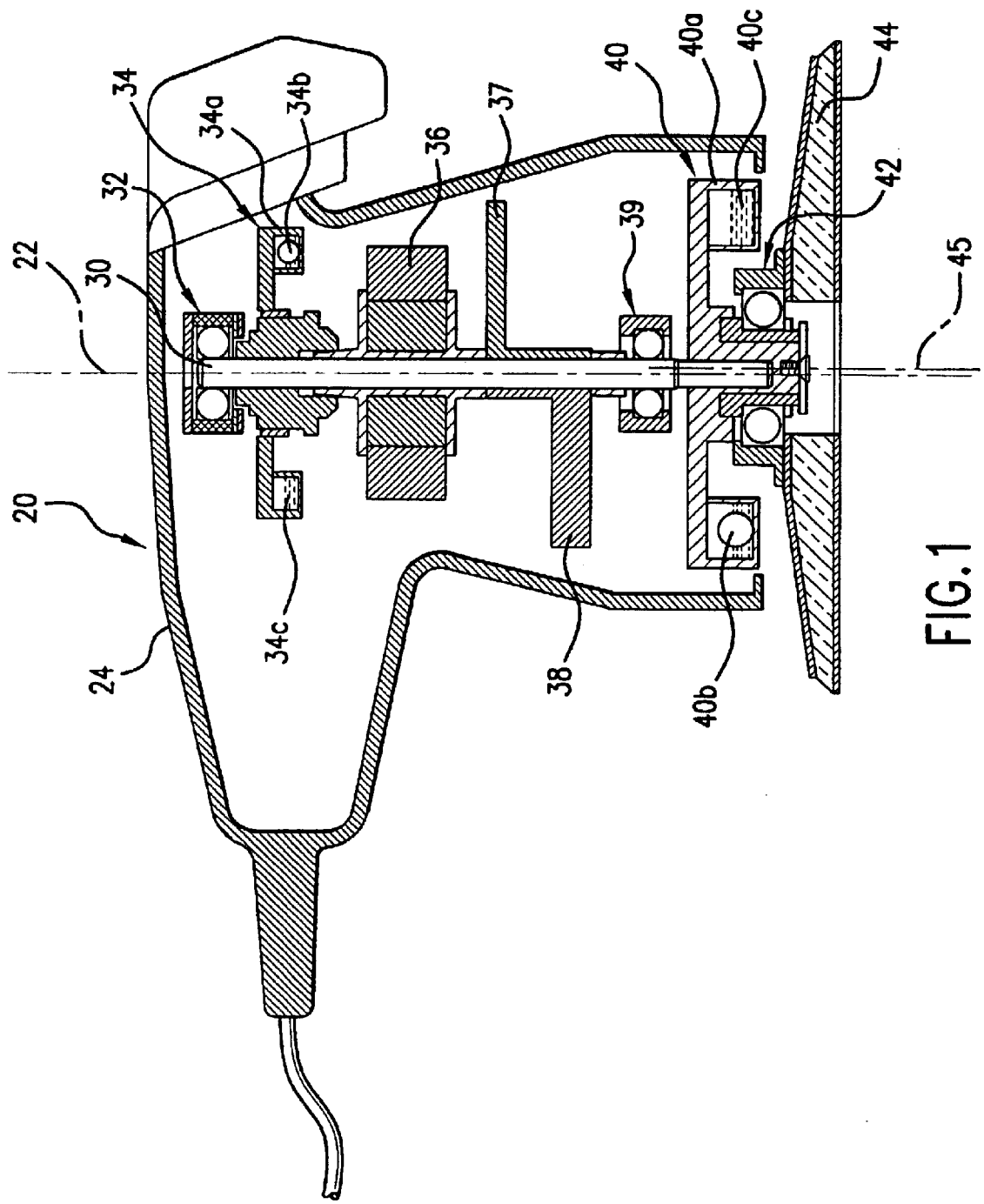
FIG. 1 is a side sectional view of an orbital sander including an automatic balancing apparatus according to an embodiment of the invention.

Referring initially to FIG. 1, an automatic balancing apparatus according to one embodiment of the invention is shown mounted within a housing for an orbital sander 20. The automatic balancing apparatus includes a main central shaft 30 that is rotatably mounted within the housing 24 of the orbital sander 20. An eccentrically mounted sanding pad 44 is mounted at the lower end of the shaft 30, with the axis 45 about which the sanding pad 44 rotates being offset from the central axis 22 of the shaft 30. The shaft 30 is rotatably mounted within an upper bearing 32 and a lower bearing 39, and an additional friction pad bearing 42 rotatably mounts the friction pad 44 eccentrically to the central axis 22 of the shaft 30.

In the embodiment shown in FIGS. 1, 1A, 1B, and 1C, the central shaft 30 of the automatic balancing apparatus supports an upper automatic balancer 34 and a lower automatic balancer 40 along with a first counterweight 37 and a second counterweight 38. In the embodiment shown in FIGS. 1, 1A, 1B and 1C, the upper automatic balancer 34 is a smaller "trim" balancer, and the lower automatic balancer 40 is a larger, main balancer. A motor 36, which can be electric, pneumatic or hydraulic, is mounted to the shaft 30 to rotatably drive the shaft 30 within the upper and lower bearings 32, 39.

Figure 1A:
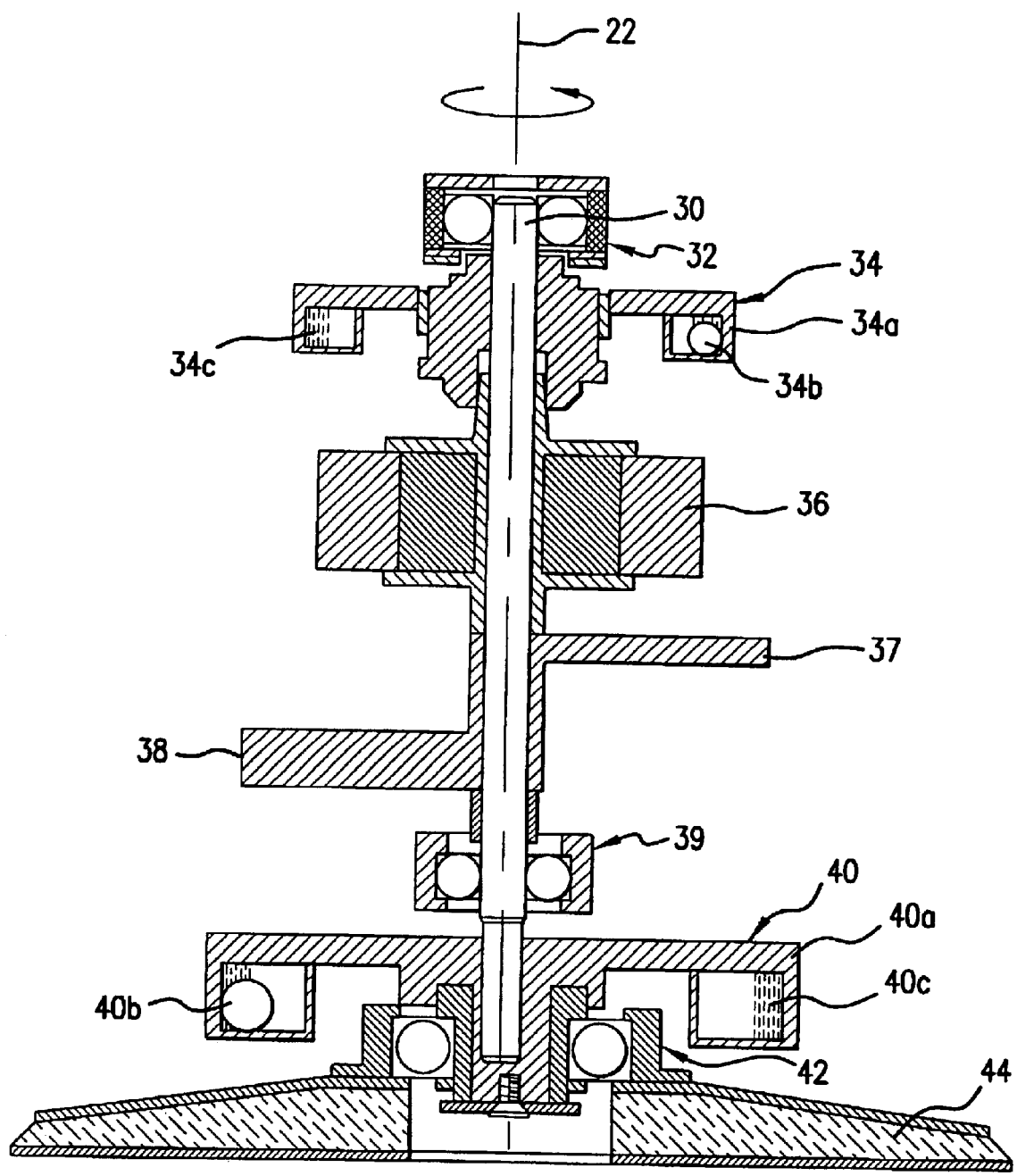
FIG. 1A is a further side sectional view of the automatic balancing apparatus shown in FIG. 1.
Figure 1B:
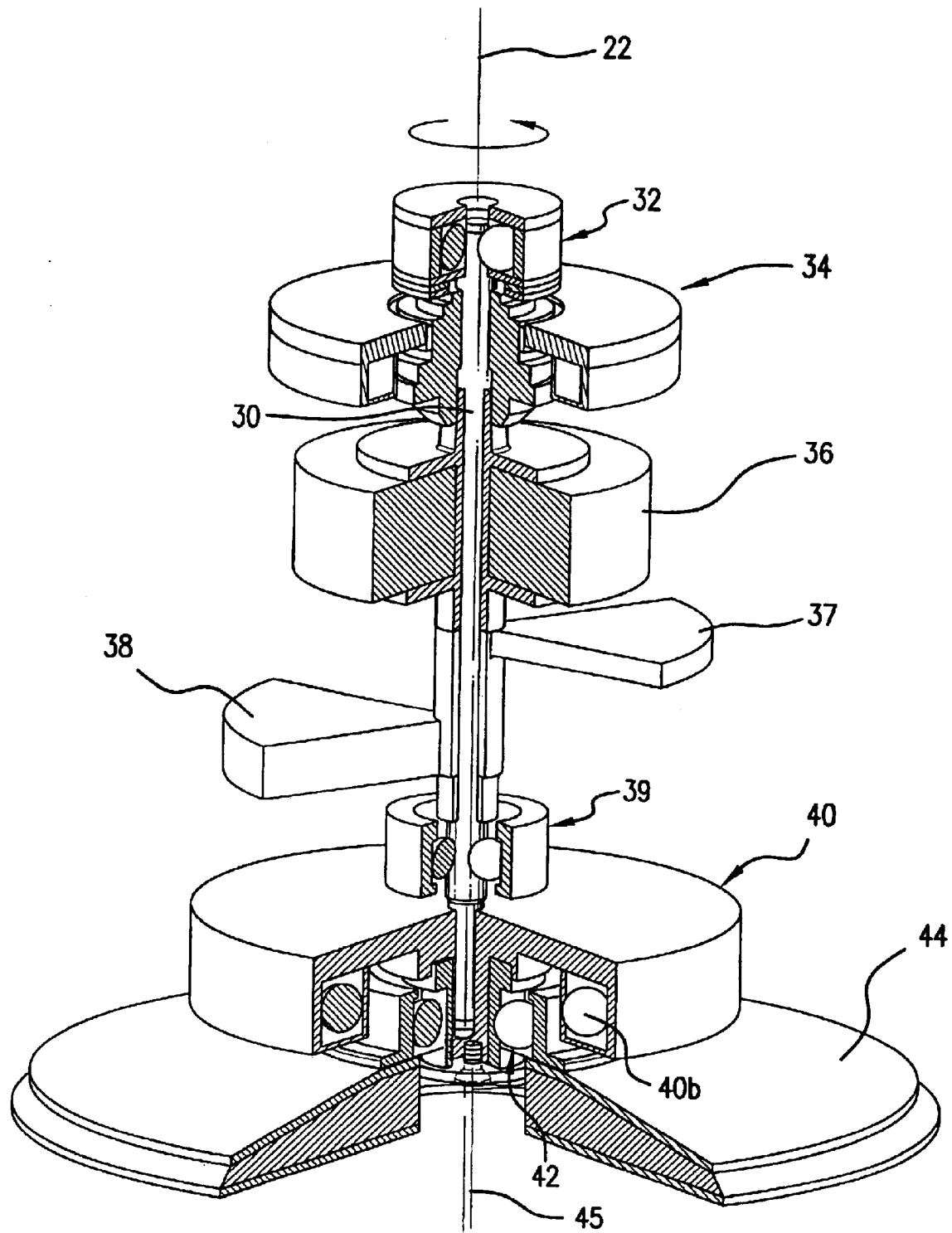
FIG. 1B is a perspective view of the automatic balancing apparatus shown in FIG. 1.

As best seen in FIGS. 1 and 1A, the upper automatic balancer 34 includes a balancer housing 34a, which defines an annular cavity within which one or more compensating masses 34b and optional balancer fluid 34c are contained. Although the compensating masses 34b shown in the embodiment of FIG. 1 are illustrated as spherically shaped masses, these compensating masses could be provided in any of a variety of different shapes such as spherical, disc-like or cylindrical. The compensating masses 34b are freely movable within the cavity defined by balancer housing 34a, and an appropriate lubricant or balancer fluid 34c can be provided within the cavity to reduce the friction between the compensating masses and the balancer housing 34a, as well as to reduce noise made by the compensating masses when the balancing apparatus is in operation. The balancing fluid 34c also creates an appropriate amount of viscous dampening on the compensating masses.

In the illustrated embodiments, a main balancer 40 containing larger sized compensating masses, is also mounted to the shaft 30 in a position closer to the plane of the eccentrically mounted sanding pad 44. The main balancer 40 includes a balancer housing 40a, which defines a cavity within which the compensating masses 40b are free to move. An optional balancer fluid 40c can also be contained within the cavity defined by balancer housing 40a.

Figure 1C:
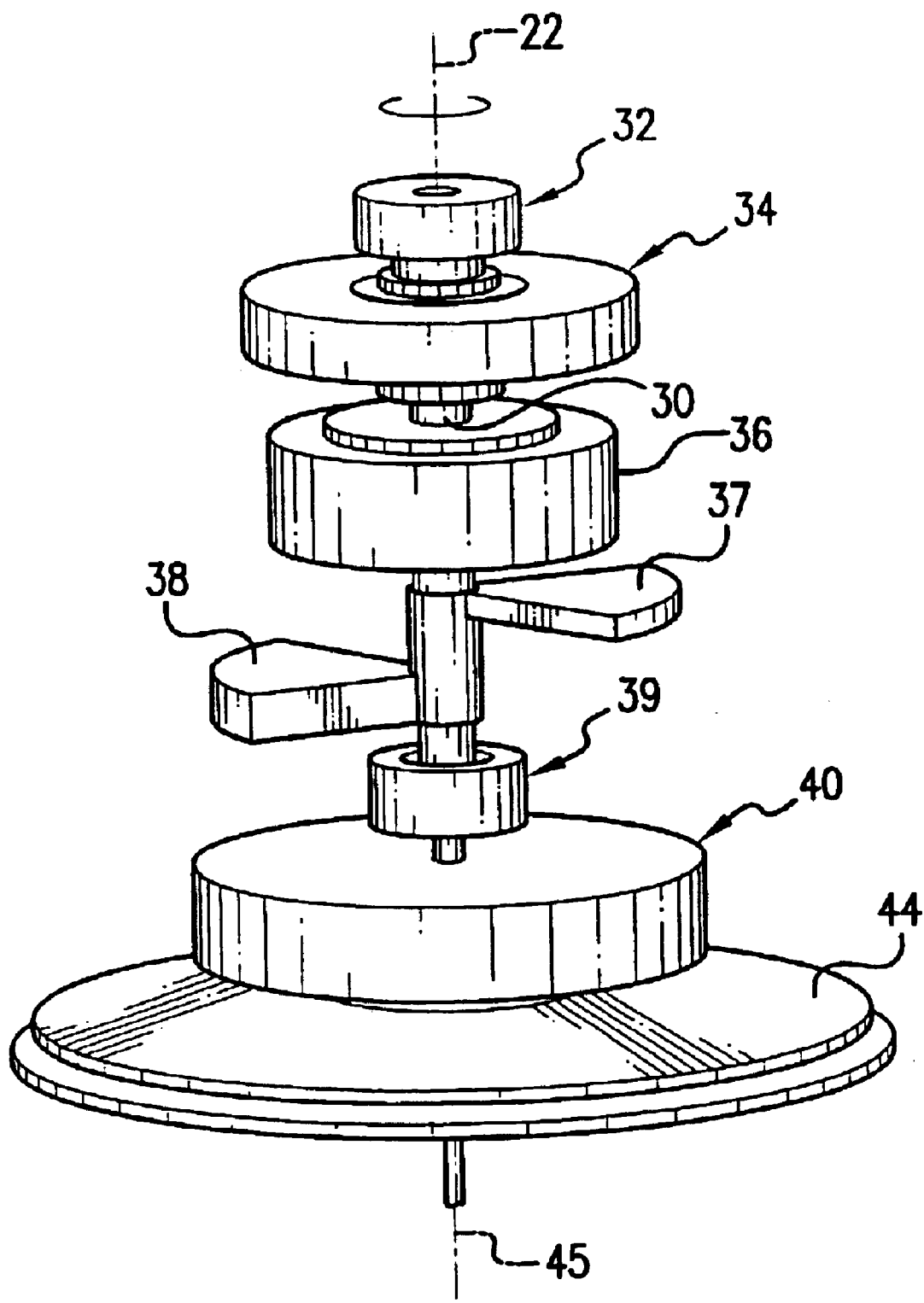
FIG. 1C is a further perspective view of the automatic balancing apparatus shown in FIG. 1.

FIGS. 4A–4I show the automatic balancing apparatus of FIGS. 1–1C in different applications wherein different forces are acting on the automatic balancer. As shown in FIGS. 4A–4I, as the automatic balancer is rotated about shaft 30, a first counter balance force F1 is created by the counterweight 38, and a second counter balance force F2 is created by the counterweight 37. The first and second counterweights 38, 37 are selected to balance the orbital sander for an average or mean operation, wherein the first counter balance force F1 and second counter balance force F2 are sufficient to compensate for all imbalances created during an average or mean operation. An eccentric imbalance force $F_i$ is created as a result of the rotation of the sanding pad 44 about the eccentric axis 45, and the rotation of eccentric axis 45 about the central axis 22 of the main shaft 30. A rotating friction force $F_f$ is created as a result of the contact between the sanding pad 44 and a work piece that is being sanded. This friction force $F_f$ acts tangentially to the main shaft 30 since it is directed from the eccentric axis 45, as shown in FIGS. 4B, 4E, 4H, 4K, 4N and 4Q. In the situation shown in FIGS. 4A–4C, the counterweights 37, 38 are compensating for all of the dynamic forces acting on the automatic balancing apparatus, with the automatic balancers 34, 40 adding nothing to the balanced situation, as illustrated by the even distribution of the compensating masses 34b in the smaller balancer 34, and the even distribution of the compensating masses 40b in the main balancer 40. The counterweights 37 and 38 are typically set at the factory to provide suitable compensation for the unbalanced forces resulting from a typical use. Any deviation from such a typical use or any change in the sanding conditions would result in the change of the friction force $F_f$ and would thus result in the unbalanced condition which in turn is compensated for by the automatic balancers.

Figure 4D:
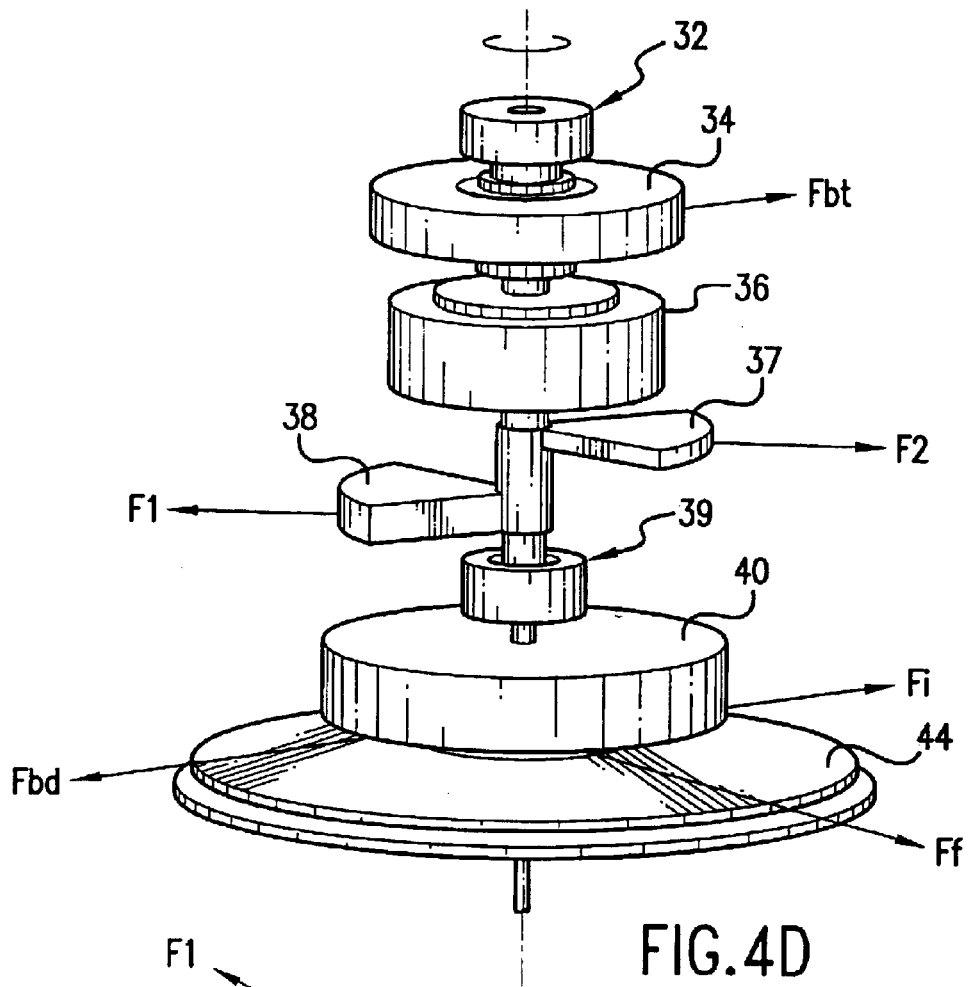
FIG. 4D is a further perspective view of the automatic balancing apparatus according to the first embodiment of the invention and showing various forces acting on the balancing apparatus.
Figures 4E, 4F:
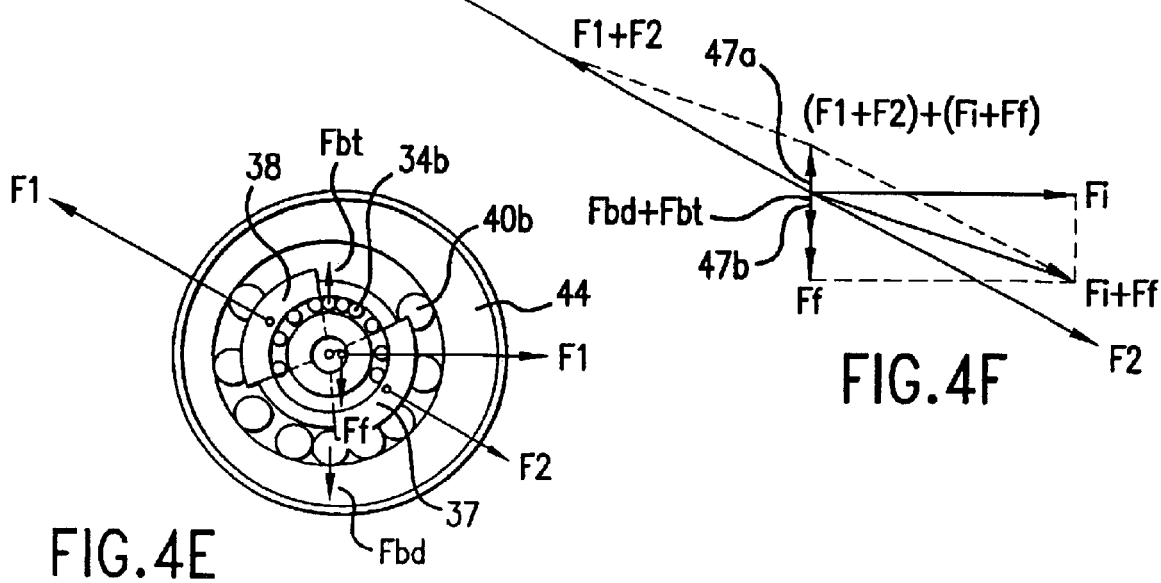
FIG. 4E is a top plan view, partially sectioned, of the balancing apparatus shown in FIG. 4D, and illustrating various forces acting on the components of the balancing apparatus.
FIG. 4F is a diagrammatic representation of the various forces acting on the balancing apparatus shown in FIG. 4D. Specifically.

Specifically, FIGS. 4D–4F illustrate a situation wherein the automatic balancing apparatus of an orbital sander is being used in a light sanding operation. During this situation, the rotating friction force $F_f$ is relatively small compared to the friction force $F_f$ under normal sanding operation, as shown in FIG. 4F, so the counter balance forces F1 and F2 created by counterweights 38, 37 overcompensate for the imbalance forces. This gives rise to the overall unbalanced force 47a (FIG. 4F). Furthermore, since all the unbalanced forces lie in different planes along the shaft 22, an unbalanced moment or couple results. In this situation the compensating masses 40b of the main balancer 40 and the compensating masses 34b of the trim balancer 34 position themselves substantially so as to counteract the overall unbalanced force 47 and the associated unbalanced moment or couple. A main balancer force $F_{bd}$ is generated by the large compensating masses 40b within the main balancer 40, and a smaller or trim balancer force $F_{bt}$ is generated by the compensating masses 34b within the smaller or trim balancer 34 resulting in the effective counterbalance force 47b. As a result of the movement and positioning of the compensating masses within the balancers 34 and 40, the overcompensation of counterweights 37, 38 is counteracted to balance the entire balancing system as shown in FIG. 4F. Because the trim balancer 34 is mounted in a different plane than the main balancer 40, the forces generated by the compensating masses within the balancers counteract the imbalance forces and the imbalance moments created by the friction force $F_f$, the imbalance force $F_i$ and the counterweight forces F1 and F2. In accordance with embodiments of the present invention, it has been discovered that the trim balancer force $F_{bt}$ and the main balancer force $F_{bd}$ acting in different planes along the main shaft 30, are effective in counterbalancing the tangential imbalanced forces generated by the resistance between the rotating component, e.g., the orbital sanding pad, and the medium upon which the rotating component is acting, e.g., a workpiece being sanded.

As shown in FIGS. 4D and 4E, the main balancer force $F_{bd}$ acts in the opposite direction from the trim balancer force $F_{bt}$, as well as acting in a plane closer to the plane within which the imbalanced forces $F_f$ and $F_i$ are acting than the plane of the trim balancer force $F_{bt}$. The arrangement of counterweights and automatic balancers in axially spaced positions along the shaft 30 therefore results in the dynamic balancing of radial imbalanced forces, tangential imbalanced forces, and the associated imbalance moments or couples.

FIGS. 4G–4I illustrate the situation wherein the automatic balancing system is used during a heavy sanding operation. In this situation the rotating friction force $F_f$ is relatively large as compared to the friction force $F_f$ for normal sanding operation, as shown in FIG. 4I. Accordingly, the counter balance forces F1, F2, created by counterweights 38, 37 under-compensate for the dynamic forces created by operation of the orbital sander. This results in the overall unbalanced force 48a and the associated unbalanced moment or couple. In this case, the large compensating masses 40b within main balancer 40 and the small compensating masses 34b within trim balancer 34 shift their positions within the balancers so as to counteract the overcompensation by counterweights F1, F2, with the effective counterbalance force 48b, and bring the entire automatic balancing system into equilibrium, as shown in FIG. 4I. As illustrated in FIGS. 4G and 4H, the large tangential imbalanced friction force $F_f$ is counteracted by the main balancer force $F_{bd}$, which acts in the opposite direction and in a plane close to the plane of the imbalanced forces $F_f$ and $F_i$. The additional trim balancer force $F_{bt}$ acts in a plane farther away from the plane of the imbalanced forces than the main balancer, and in the opposite direction from the main balancer force $F_{bd}$. As a result, both the radial and tangential imbalanced forces and moments are counteracted, and the system is brought into equilibrium.

FIGS. 4J–4L show the system in the same situation as the automatic balancing system according to an embodiment of the invention shown in FIGS. 4D–4F, but with the automatic balancers 34, 40 being removed. In this situation the dynamic forces created by a rotating friction force $F_f$ and imbalance force $F_i$ are perfectly compensated by the counter balance forces F1, F2 created by counterweights 37, 38.

FIGS. 4M–4O show the system in the same situation as the automatic balancing system according to an embodiment of the invention shown in FIGS. 4D–4F, but with the balancer not including automatic balancers 34, 40. In this situation the orbital sander is being used in a light sanding application such that the rotating friction force $F_f$ is relatively small compared to the normal friction force $F_f$. Accordingly, without the presence of automatic balancers, the counterweights F1, F2 overcompensate for the dynamic forces $F_f$, $F_i$ thereby giving rise to an unbalanced force $F_U$ such as shown in FIG. 4O.

FIGS. 4P–4R illustrate the system in the same situation as the automatic balancing system according to an embodiment of the invention shown in FIGS. 4G–4I, but with the balancer not including automatic balancers 34, 40. In this situation the rotating friction force $F_f$ is relatively large compared to the normal friction force $F_f$, and therefore the counter forces F1, F2 created by counterweights 37, 38 under compensate for the dynamic forces, giving rise to an unbalanced force $F_U$ as shown in FIG. 4R.

Figure 2:
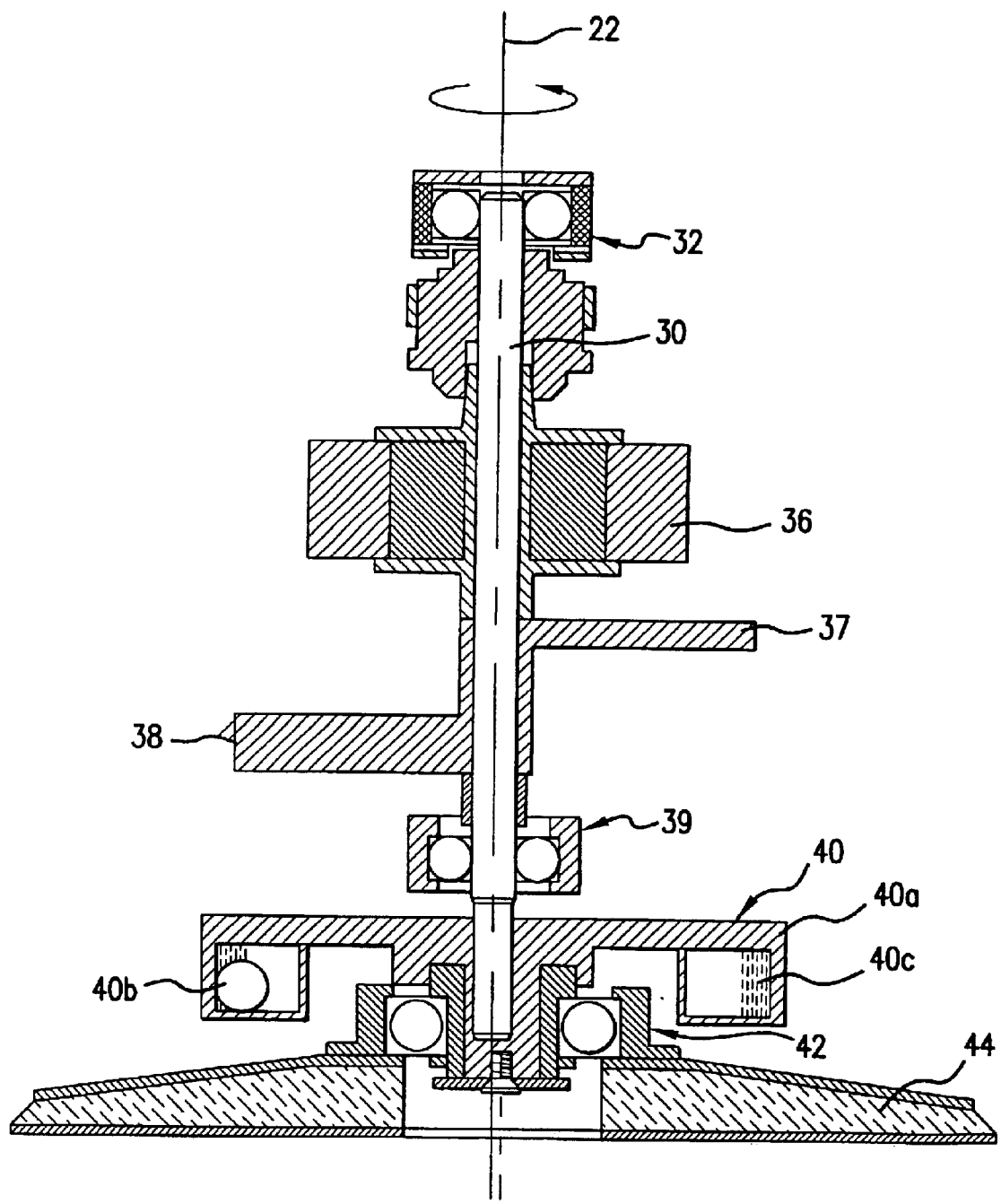
FIG. 2 is a side sectional view of an automatic balancing apparatus for use with an orbital sander according to a second embodiment of the invention.
Figure 2A:
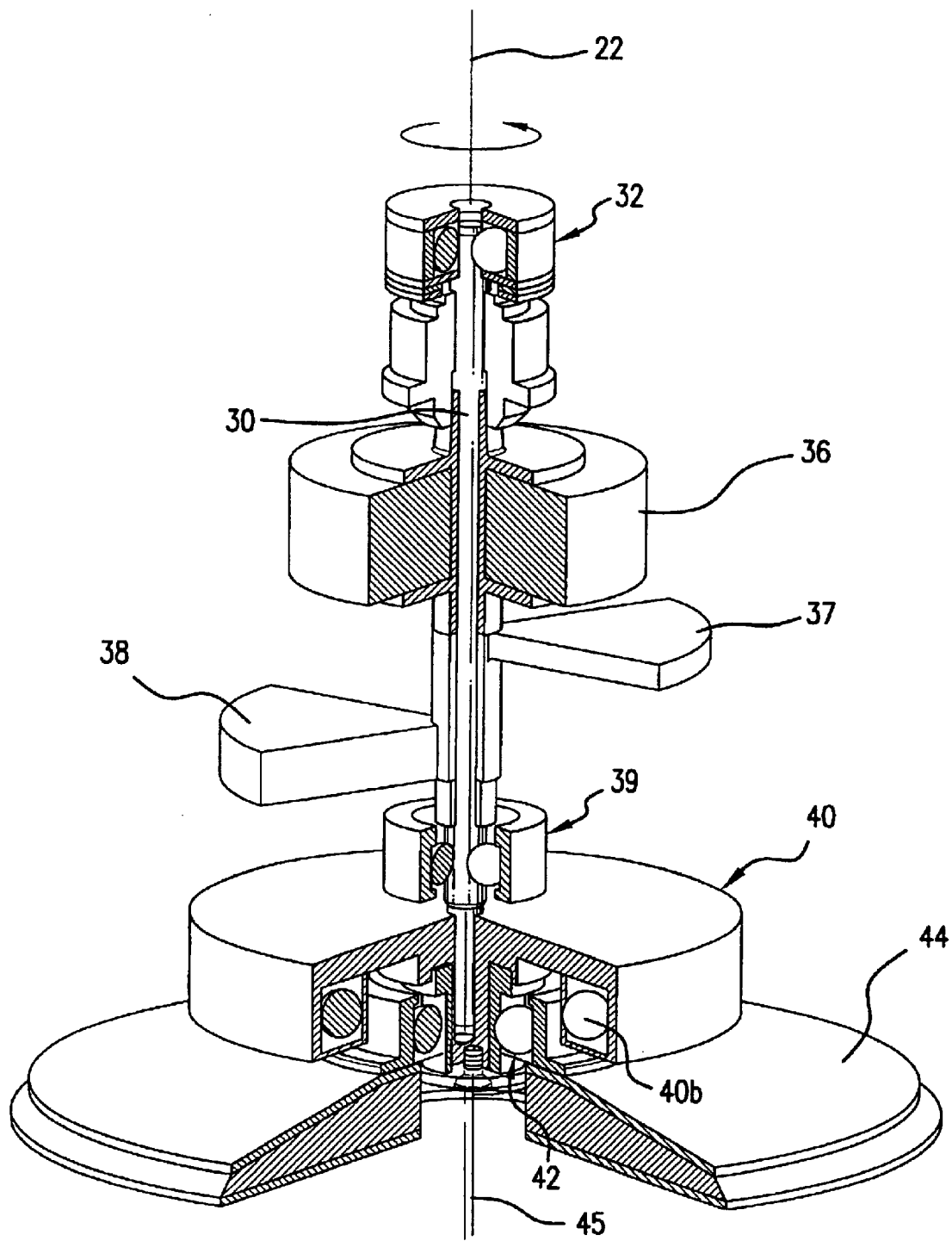
FIG. 2A is a perspective view of the automatic balancing apparatus shown in FIG. 2.

An alternative embodiment of an automatic balancing system according to the invention is illustrated in FIGS. 2 and 2A. In this embodiment the smaller trim balancer 34 is eliminated, with a large main balancer 40 being located in a plane close to the plane of the orbital sander 44, and counterweights 37, 38 being mounted to shaft 30 in axially spaced positions farther away from the sanding pad 44. It is noted here that a preferred embodiment includes two automatic balancers such as the embodiment of FIG. 4A, 4D, or 4G. However, for cases where the unbalanced moments or couples are small as compared to the mass of the system, it is possible to achieve acceptable balancing with a single automatic balancer as shown in FIGS. 2 and 2A.

Figure 3:
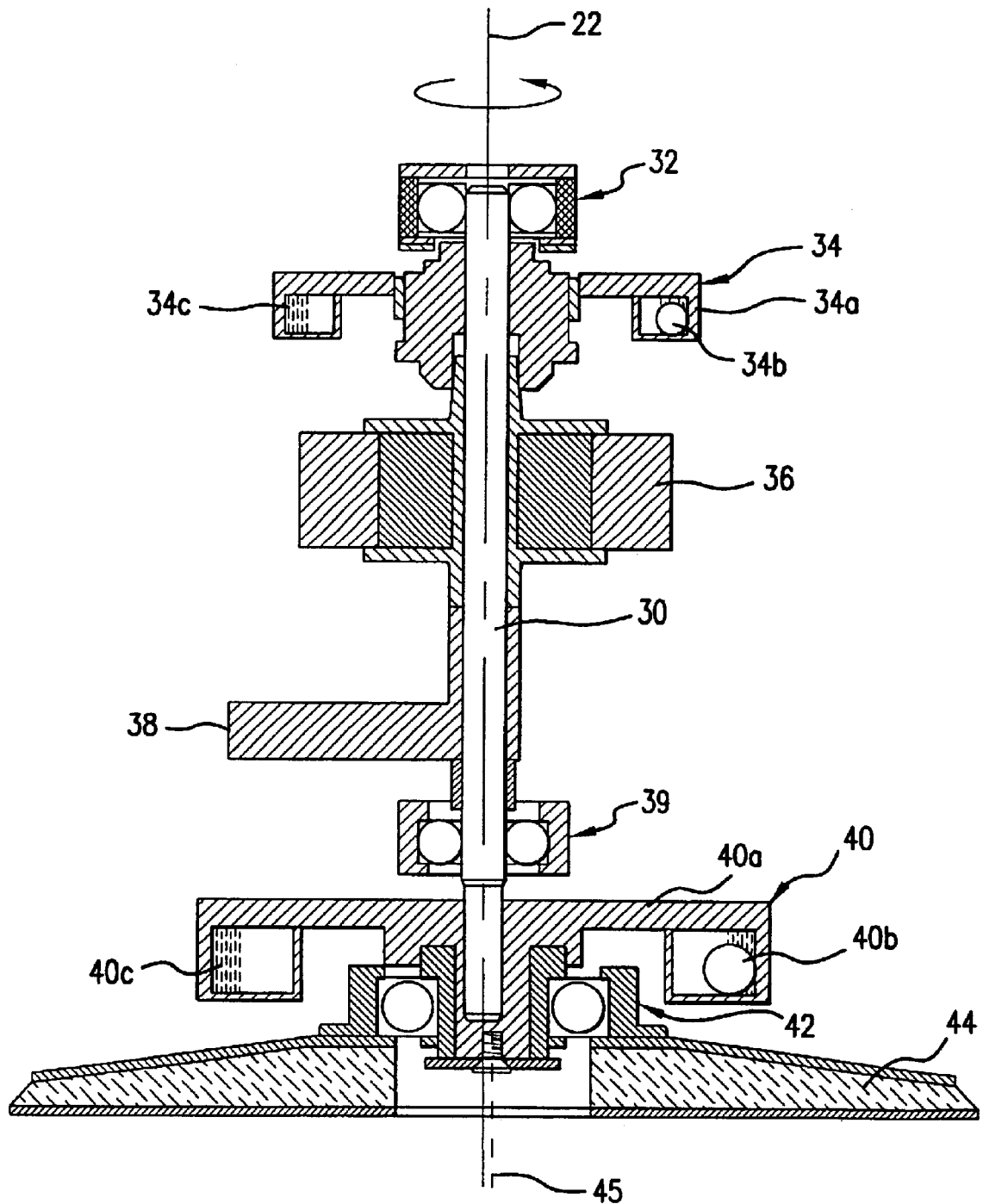
FIG. 3 is a side sectional view of an automatic balancing apparatus for an orbital sander according to a third embodiment of the invention.

A further embodiment is shown in FIG. 3, wherein a smaller trim balancer 34 and a larger main balancer 40 are provided, but only one counterweight 38 is mounted on the shaft 30. As with the other embodiments discussed above, the main balancer 40 is located in a plane close to the plane of the sanding pad 44, with the trim balancer 34 being located on shaft 30 as far away from the plane of the sanding pad 44 as possible. The one counterweight 38 is mounted on shaft 30 in between the balancers 34, 40.

Figure 5A:
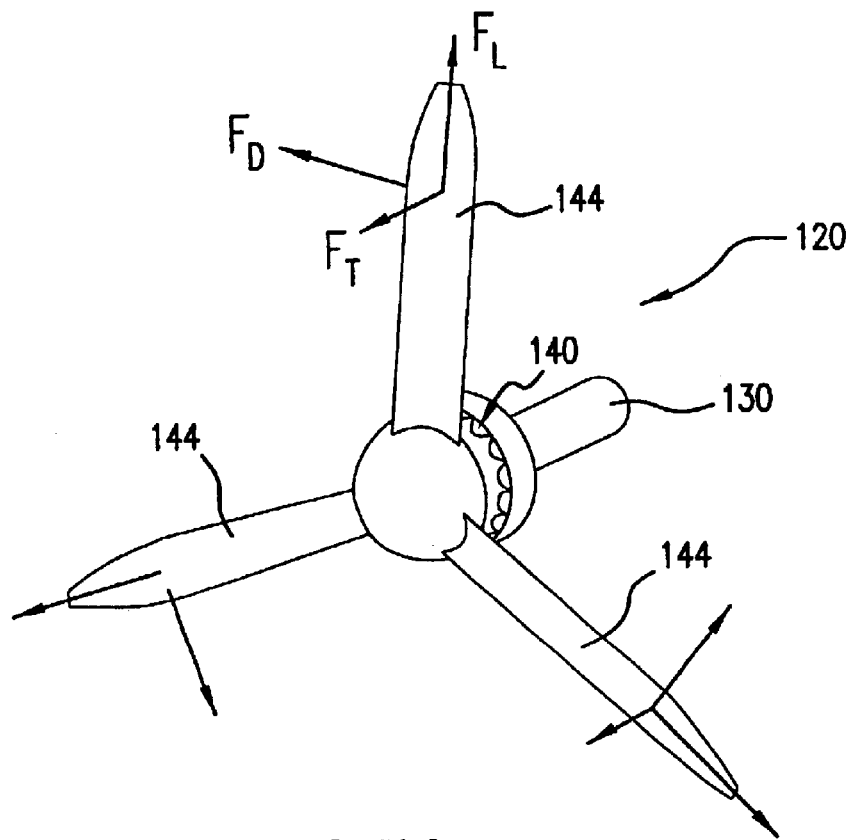
FIG. 5A illustrates a propeller having a balancer according to an embodiment of the invention.
Figure 5B:
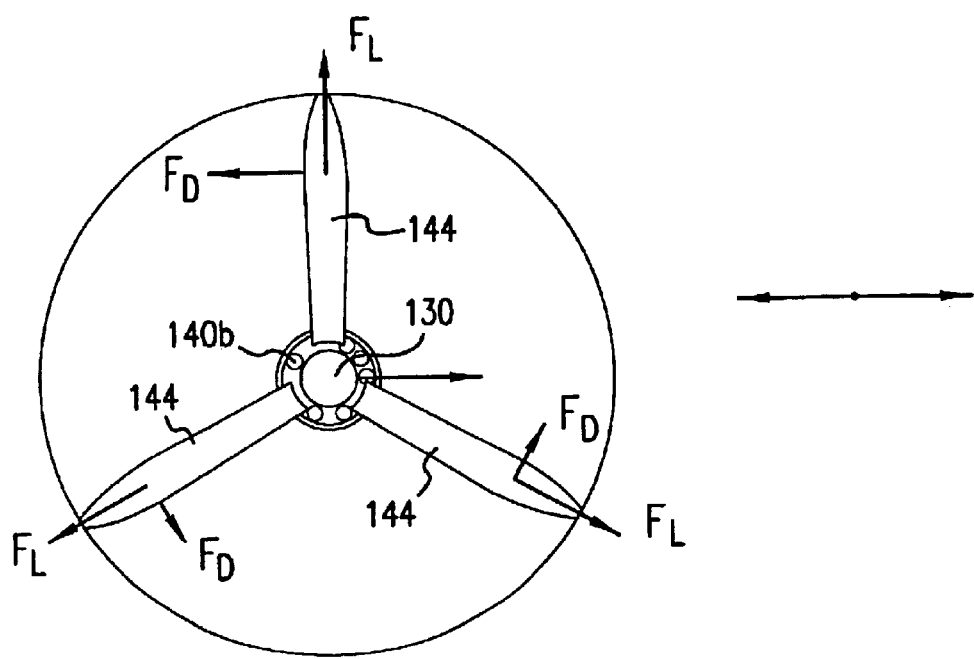
FIG. 5B is a front view of the propeller shown in FIG. 5A.

Similar principles and mechanisms can be used for providing dynamic balancing of a propeller, such as shown in the embodiment of FIGS. 5A and 5B. Propeller blades 144 extend radially from a propeller hub 145, and are driven to rotate about shaft 130. As the propeller is rotated, a drag force $F_D$ is generated by the friction between the blades 144 and the surrounding fluid. The shape of the propeller blades 144 results in the creation of a radial force $F_L$, and an axial thrust force $F_T$. The rotating unbalanced forces created by drag force $F_D$ and the radial unbalanced force $F_L$ can be compensated for by an automatic balancer 140, which includes one or more compensating masses that are free to move about an annular race defined by the housing of the balancer 140. Although only one automatic balancer is illustrated, it will be recognized that alternative embodiments can include additional automatic balancers and/or fixed counterweights, positioned in different planes and providing a desired combination of forces to counteract any imbalanced forces generated during operation of the device.

Figure 6A:
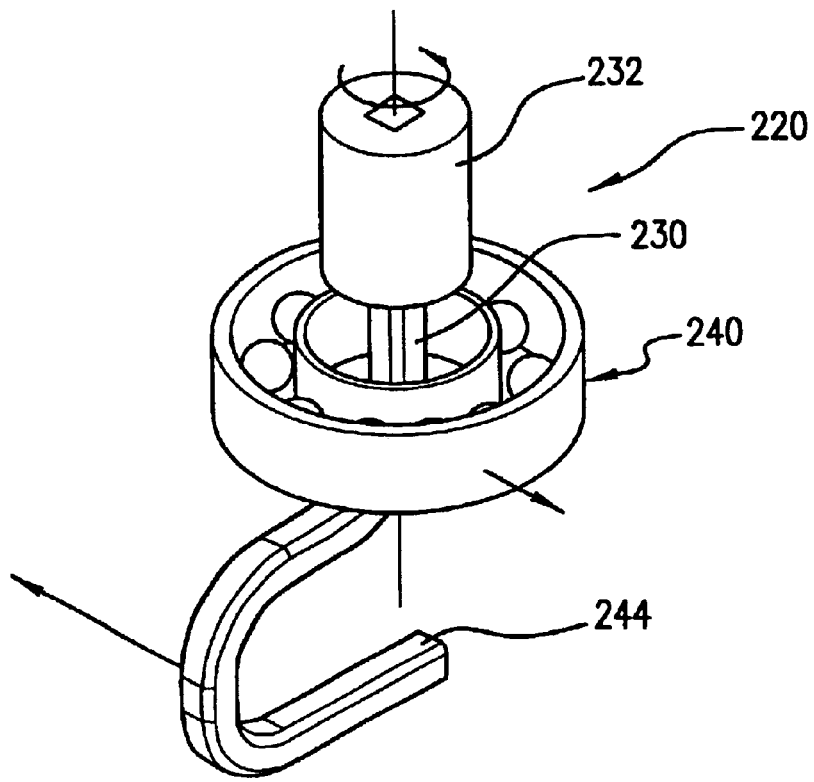
FIG. 6A is an illustration of a mixer having a balancer according to an embodiment of the invention.
Figure 6B:
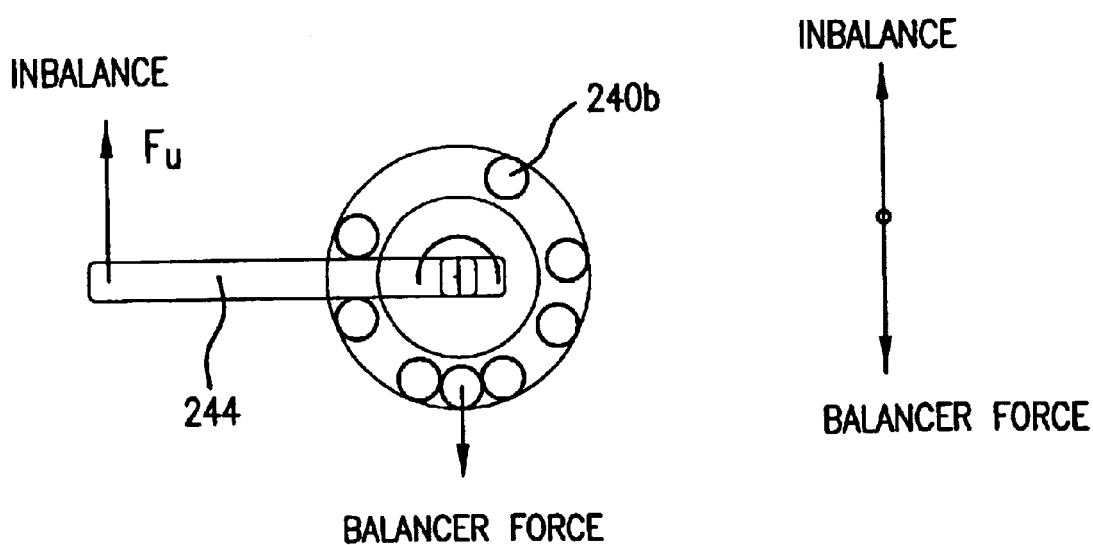
FIG. 6B is a top plan view, in partial section, of the mixer shown in FIG. 6A.

In the embodiment shown in FIGS. 6A and 6B, a mixer uses similar balancing mechanisms and principles, with an automatic balancer 240 mounted to the main shaft 230. As the shaft 230 rotates within a support bearing 232, imbalance forces $F_U$ are created by the friction between the mixing arm 244 and the substance being mixed. These imbalanced forces can be compensated for by movement of the compensating masses 240*b* within the housing of the automatic balancer 240. As with the embodiment illustrated in FIGS. 5A and 5B, although only one automatic balancer is illustrated, it will be recognized that alternative embodiments can include additional automatic balancers and/or fixed counterweights, positioned in different planes and providing a desired combination of forces to counteract any imbalanced forces and moments generated during operation of the device.

While specific embodiments of the invention have been described, such embodiments should be considered as illustrative of the invention only and not as limiting its scope as defined in accordance with the following claims.

What is claimed is:

1. A device having a rotatable component and automatic balancing, comprising:
   a housing;
   a shaft rotatably mounted in said housing, said shaft supporting the component proximate to one end of said shaft;
   at least one counterweight fixedly mounted on said shaft; and
   at least one automatically adjusting balancer mounted on said shaft, said balancer comprising one or more compensating masses contained to move about a path relative to said shaft to compensate for variable imbalanced forces acting on said component.

2. The device according to claim 1, wherein
   one of said at least one counterweight is fixedly mounted on said shaft, and
   one of said at least one automatically adjusting balancer is mounted on the shaft at a position axially spaced from said one counterweight.

3. The device according to claim 1, wherein
   two of said at least one counterweight are fixedly mounted on said shaft at axially spaced locations, and
   one of said at least one automatically adjusting balancer is mounted on the shaft at a position axially spaced from said two counterweights.

4. The device according to claim 1, where
   one of said at least one counterweight is fixedly mounted on said shaft, and
   two of said at least one automatically adjusting balancer are mounted on the shaft at positions axially spaced from said one counterweight.

5. The device according to claim 1, wherein:
   two of said at least one counterweight are fixedly mounted on said shaft at axially spaced locations, and
   two of said at least one automatically adjusting balancer are mounted on the shaft at positions axially spaced from said two counterweights.

6. The device according to claim 1, wherein:
   said at least one automatically adjusting balancer is mounted on said shaft closer to a plane within which said variable imbalanced forces are acting on said component than said at least one counterweight.

7. A device including a rotatably mounted component subjected to unbalanced frictional forces during operation, comprising:
   a housing;
   a shaft rotatably mounted in said housing, said shaft supporting the component proximate to one end of said shaft; and
   two or more automatically adjusting balancers mounted on said shaft in different planes from each other and in planes different from the plane within which the unbalanced frictional forces act on the component during operation of the device, said automatic balancers each comprising one or more compensating masses contained to move about a path relative to said shaft to compensate for the unbalanced frictional forces acting on said component.

8. The device according to claim 7 is an orbital sander.

9. The device according to claim 7, further including at least one counterweight fixedly mounted on the shaft.

10. The device according to claim 7, wherein the rotatably mounted component rotates about an axis that is eccentric to a central axis of the shaft.

11. The device according to claim 10, wherein the unbalanced frictional forces acting on the component during use, are directed tangentially to the shaft.

12. A method of removing variable unbalanced frictional forces acting on a device, wherein the device includes a component that is attached to a shaft and is rotated to perform work on a medium during operation of the device, the method comprising:
   mounting a first automatically adjusting balancer to the shaft in a plane that is different than a plane within which the variable unbalanced frictional forces act on the component during operation of the device, said automatically adjusting balancer including one or more compensating masses contained to move about a path relative to said shaft to compensate for the variable unbalanced frictional forces acting on said component.

13. The method according to claim 12, further including:
   fixedly mounting a counterweight to said shaft in a plane different than the plane within which said automatically adjusting balancer is mounted.

14. The method according to claim 13, wherein said automatically adjusting balancer is mounted in a plane closer to the plane within which the variable unbalanced frictional forces act than the plane within which the counterweight is fixedly mounted.

15. The method according to claim 12, wherein the component is rotated about an axis eccentric to the central axis of the shaft such that the variable unbalanced frictional forces resulting when said component is rotated to perform work on a medium are tangential to said shaft.

16. The method according to claim 15, further including mounting a second automatically adjusting balancer to said shaft in a plane different than the plane within which said first automatically adjusting balancer is mounted.

17. The method according to claim 16, wherein said second automatically adjusting balancer comprises one or more compensating masses contained to move about a path relative to said shaft, and said one or more compensating masses of said second automatically adjusting balancer are smaller than said one or more compensating masses of said first automatically adjusting balancer.

18. The method according to claim 12, wherein said device is an orbital sander and said component is a sanding pad that is rotated to sand a workpiece.

19. The method according to claim 12, wherein said device is a propeller, and said component is a propeller blade that is rotated to move a fluid.

20. The method according to claim 12, wherein said device is a mixer, and said component is a mixing arm that is rotated to process a food product.

* * * * *